United States Patent [19]

Rueter

[11] Patent Number: 5,782,989
[45] Date of Patent: Jul. 21, 1998

[54] SOLVENT SYSTEM AND METHOD FOR REMOVING POLYMER SCALE FROM VINYL POLYMER POLYMERIZATION REACTORS

[75] Inventor: Michael A. Rueter, Norristown, Pa.

[73] Assignee: Arco Chemical Technology, L.P., Greenville, Del.

[21] Appl. No.: 974,401

[22] Filed: Nov. 19, 1997

[51] Int. Cl.$^6$ .................................................. B08B 9/00
[52] U.S. Cl. .................. 134/22.19; 134/2; 134/22.1; 134/22.16; 134/22.17; 134/35; 134/38; 134/40; 510/188; 510/435; 510/499; 510/505; 510/506
[58] Field of Search ................................ 510/188, 247, 510/435, 506, 499, 212, 118, 505; 134/2, 22.1, 22.16, 22.17, 22.19, 35, 38, 40

[56] References Cited

U.S. PATENT DOCUMENTS

| | | | |
|---|---|---|---|
| 4,098,972 | 7/1978 | Ogawa et al. | 526/62 |
| 4,588,613 | 5/1986 | Liau et al. | 427/230 |
| 4,661,569 | 4/1987 | Kleine et al. | 526/62 |
| 5,424,003 | 6/1995 | Shimizu et al. | 252/181 |

*Primary Examiner*—Jill Warden
*Assistant Examiner*—Sharidan Carrillo
*Attorney, Agent, or Firm*—Brooks & Kushman

[57] ABSTRACT

Polymer scale removal from vinyl polymerization reactors is effected without the use of polar aprotic solvents or aromatic solvents, by adding to the reactor, a scale removal composition comprising acetone, a most minor amount of a strong base, and a minor amount of a hydroxyl- or amino-functional polar organic solvent. The composition may contain surfactants, chelating or sequestering agents, detergent builders, and the like, and water in amounts of up to about 3 weight percent. Scale removal is efficient and rapid when the scale removing composition is agitated in the reactor at temperatures ranging from about 50° C. to 120° C.

20 Claims, No Drawings

SOLVENT SYSTEM AND METHOD FOR REMOVING POLYMER SCALE FROM VINYL POLYMER POLYMERIZATION REACTORS

TECHNICAL FIELD

The present invention pertains to a solvent system useful for removing polymer scale from reactors used in vinyl polymerization. More particularly, the present invention pertains to a solvent system which is highly efficient to remove polymer scale from reactors used to manufacture polymer polyols.

BACKGROUND OF THE INVENTION

During polymerization of vinyl monomers to form polyvinyl polymers, a build up of polymer on the walls of the reactor is frequently encountered. The chemical characteristics of this "polymer scale" varies widely depending upon the polymerization conditions. For example, the vinyl polymer may be of high or low molecular weight, may be highly crosslinked or relatively uncrosslinked, may be polymerized in bulk, or may be the result of agglomeration and/or coagulation of individual vinyl particles. Moreover, the nature of the polymer scale will also be dependent upon the nature of the polymerization conditions, i.e. vapor phase, neat or bulk polymerization, emulsion polymerization, and the like. Finally, when polymerizations are conducted in a solvent or as a dispersion in a continuous phase, the nature of the solvent and/or continuous phase may also dictate the nature of the polymer scale. This polymer scale may additionally contain residues produced by reaction with the solvent, or with the polymerization catalyst or initiator and/or their decomposition products. Due to the continual scale build up in the reactor, it is necessary to shut down the reactor periodically and remove the scale.

Scale removal methods have often been labor-intensive, time-intensive, and occasionally fraught with danger. For example, it has been common in the past to manually scrape the walls of the reactor with or without a prior or a contemporaneous use of powerful solvents to assist in removing the scale. These operations have necessitated a worker to physically enter the polymerization reactor and scrape the walls, generally with wooden bladed instruments, or more recently, instruments constructed of polymer materials. These relatively soft scraping tools are used in the place of harder tools such as metal-bladed scrapers, as the latter might easily damage the lining of the reactor which is often of a glass or ceramic material.

In lieu of, or in conjunction with manual scraping, various powerful solvent systems have been utilized. For example, in Japanese patent JP 60/6709, mixtures of methylene chloride and other solvents, are promoted as a solvent for the cleaning of styrene/acrylonitrile (SAN) polymerization reactors, for example methylene chloride containing 15% methylethylketone. Japanese patent JP 78/108188 discloses the use of dimethylsulfoxide containing very small amounts of sodium hydroxide. Japanese patents JP 63/39995 and JP 63/39907 employ relatively expensive dimethylimidazolidinone containing a strong base, such as sodium hydroxide and sodium methoxide, respectively. Aromatic solvents such as benzene and toluene have also been used, as illustrated by Japanese patent JP 55/29551 which employs a mixture of 70% toluene and 30% ethanol A mixture of benzene or toluene together with any of a variety of higher ketones in admixture with cumene hydroperoxide is disclosed in U.S. Patent No. 2,749,313.

Aqueous systems have also been employed, despite the limited solubility of vinyl polymers in water. In such aqueous systems, a wide variety of surfactants, detergent builders, strong bases, and oxidizing agents have been employed to assist in polymer degradation to enhance solubility and/or dispersion of the polymer scale in the aqueous system. For example, JP 61/192748 and JP 61/53398 both disclose the use of aqueous systems employing potassium permanganate, a very strong oxidizing agent, along with 7% sodium hydroxide and 10% sodium hydroxide, respectively.

In U.S. Pat. No. 3,997,360, the use of a solvent composition consisting of toluene and dimethylforamide containing 0 to 7 weight percent water is utilized to remove scale from vinyl chloride polymerization reactors. In U.S. Pat. No. 4,591,391, solvent systems employing benzene or chlorinated hydrocarbons such as methylene chloride or ethylene dichloride, together with a lower alkanol such as methanol, ethanol, or isopropanol, and a cellulose ether derivative are used to remove scale by soaking the scale in the solvent mixture, followed by washing down the reactor walls with water. U.S. Pat. No. 4,863,524 discloses an aqueous composition suitable for removing scale employing a soap builder, an alkali agent, an aqueous solution or dispersion of a surfactant, and an organic solvent or polymerizable monomer. Similar compositions are disclosed in U.S. Pat. No. 4,904,309. U.S. Pat. No. 5,145,597 discloses a cleaning composition employing an aqueous solution containing 1 to 12% by weight of caustic, a small amount of a phosphate builder, a chelating agent, up to 6% by weight of a solubilizer, and from about 1–7% by weight of a non-ionic surfactant.

The polymer scale removing compositions of the prior art all suffer notable disadvantages. The highly aqueous systems, in general, are relatively inefficient at removing polymer scale which tends to be water insoluble. Incorporation of large amounts of caustic and surfactants to render the polymers soluble through decomposition and/or by dispersing these polymers into water tend to require long cleaning times. Moreover, the high proportion of surfactants, builders, and the like, imbue such cleaning compositions with disposal problems. Compositions containing oxidizing agents such as permanganates, peroxides, and hydroperoxides, when used in conjunction with organic solvents, are potentially explosive and also present a disposal problem, particularly when nitrogen or sulfur-containing solvents such as DMF and DMSO are used.

Use of highly polar aprotic solvents such as methylene chloride, DMF, and DMSO offer the ability to provide highly effective solvating compositions for polymer scale, particularly when used with minor portions of strong alkali. However, for environmental reasons, halogenated solvents are undesirable, and both DMF and DMSO are not only relatively expensive, but also are relatively toxic. Toluene is a much less effective solvent than aprotic solvents such as DMF and DMSO, and benzene is a suspected carcinogen. Some solvents which have been employed in the past are relatively expensive. DMF and DMSO are examples of relatively expensive solvents. Even more expensive are the dimethylimidazolidinones employed by the two previously cited Japanese patents, and hydroxymethyl-substituted carboxylic acids such as 2,2-bis(hydroxymethyl)propionic acid as disclosed in U.S. Pat. No. 4,731,126.

It would be desirable to provide a cleaning composition suitable for the removal of polymer scale from vinyl polymerization reactors which is effective to remove even highly crosslinked polymer scale, and which employs relatively non-toxic, inexpensive, and substantially recyclable ingredients.

SUMMARY OF THE INVENTION

The present invention pertains to a solvent system useful for removing even highly crosslinked scale from vinyl polymerization reactors which contains, as necessary ingredients, acetone, a most minor amount of a strong base, and a water soluble hydroxyl- and/or amino-functional polar organic solvent. The subject composition has proven highly effective in removing highly crosslinked polymer scale from reactors used to produce polymer polyols.

DESCRIPTION OF THE PREFERRED EMBODIMENTS

The polymer scale removal compositions of the present invention may be used to remove a variety of vinyl polymer scale. The scale removal compositions are particularly efficient for the removal of polymer scale from reactors employed in the manufacture of polymer polyols. The scale in such reactors has proven to be highly crosslinked, and difficult to remove. The scale removal compositions employ acetone as the principle solvent, together with a most minor quantity of strong base, and a minor portion of a polar organic solvent soluble in acetone.

By the term "vinyl polymer" or "polyvinyl polymer" as used herein, is meant polymers prepared by polymerization of vinyl monomers, particularly styrene, acrylonitrile, vinyl chloride, vinylidene chloride, and the like, as well as the various acrylates, methacrylates, acrylamides, and their derivatives. The scale removing composition is especially useful with homopolymeric or copolymeric vinyl polymers which are prepared from styrene and/or acrylonitrile, and those prepared from either or both these monomers together with minor quantities of other copolymerizable monomers known to those skilled in the art.

By the term "polymer polyol" as used herein is meant a polyol containing, as at least a portion of the continuous phase, one or more polyoxyalkylene polyether polyols, more particularly homo or copolymers prepared by polymerizing ethylene oxide, propylene oxide, and $C_{4-24}$ α-alkylene oxides onto a suitably hydric initiator molecule, and containing a discontinuous phase of polyvinyl polymer particles produced through the in situ polymerization of one or more vinyl monomers in the continuous phase. Such polymer polyols, termed by some as "graft polyols," are well known to those skilled in the art, and may be prepared as taught by U.S. Pat. Nos. 4,390,645; RE 33,291; 5,093,412; and 5,494,597, among others.

The principal scale removing solvent of the present invention is acetone, employed in amounts in excess of about 50 weight percent of the total composition. The acetone-containing portion of the scale removal composition may be termed the "scale removing solvent" and may comprise, in addition to acetone, other volatile, substantially non-polar organic solvents such as methylethylketone, ethylacetate, and the like. Preferably, the scale removing solvent consists substantially of acetone. The scale removal solvent is present in an amount greater than or equal to 60 percent by weight of the total composition, and when solvents in addition to acetone are present, acetone will comprise minimally about 80 weight percent of the scale removal solvent. Preferably, acetone will comprise greater than 90 weight percent of the scale removal solvent, more preferably greater than 95 weight percent.

The scale removing composition of the present invention also contains a strong base. Preferably, the strong base is a simple alkali metal hydroxide such as sodium hydroxide or potassium hydroxide. However, other strong bases which are soluble in the cleaning composition may be used as well, for example, alkyl ammonium hydroxides, alkali metal alkoxides, and the like. Preferred strong bases are potassium hydroxide and sodium hydroxide, with the latter being especially preferred. The strong base is present in an amount from up to about 0.5 weight percent, preferably up to about 0.2 weight percent, and most preferably from about 0.001 weight percent to about 0.1 weight percent. Amounts of caustic appreciably above 0.1 weight percent may reduce polymer solubility in the case of some polymer scales and thus make a less effective cleaning solution.

The scale removal compositions of the subject invention also contain a hydroxyl- and/or amino groupfunctional polar organic solvent which is soluble in acetone. The polar ingredient is believed to aid in the solubility of the alkaline ingredient and may also play a role in solubilizing and/or decomposing the polymer scale. The polar organic solvent is preferably selected from the group of alcohols, glycols, glycol monoethers, alkylamines, and alkanol amines. The amount of the polar organic solvent may be from about 0.1 weight percent to about 30 weight percent, preferably from about 0.5 to about 15 weight percent, and more preferably in the range of about 1 to 10 weight percent.

Non-limiting examples of polar organic compounds include ethylene glycol, propylene glycol, 1,3-propanediol, 1,4-butanediol, 1,2-butanediol, 1,6-hexanediol, 1,4-cyclohexanediol; methanol, ethanol, n-propanol, isopropanol, n-butanol, sec-butanol, tert-butanol; ethylene glycol monomethyl ether, ethylene glycol monoethyl ether, propylene glycol monomethyl ether; methylamine, ethylamine, propylamine, dimethylamine, diethylamine, dipropylamine, trimethylamine, triethylamine, tripropylamine; monoethanolamine, diethanolamine, triethanolamine, monopropanolamine, dipropanolamine, tripropanolamine, ethylenediamine, propylenediamine, diethylenetriamine; tetrakis [2-hydroxyethyl]ethylene diamine, tetrakis[2-hydroxypropyl]ethylene diamine, and the like. Lower $C_{2-4}$ alkylene glycols and $C_{1-6}$, preferably $C_{1-4}$ alkanols and the various alkanolamines are preferred, either singly or in admixture. Preferred glycol ethers are $C_{2-6}$ alkylene glycol mono-$C_{1-4}$ alkyl ethers.

The cleaning compositions of the present invention are preferably limited to the above ingredients. It is particularly preferred that the cleaning solutions contain little, if any, and preferably no halogenated solvents, aromatic solvents, particularly benzene, and no polar aprotic solvents such as dimethylformamide, dimethylacetamide, and dimethylsulfoxide. The composition may, however, contain N-methylpyrollidone in minor quantity. It would not depart from the spirit of the invention, and may be preferable for certain applications, to include other cleaning additives and adjuvants as well. Examples of such additives include metal ion sequesterants such as nitrilotriacetic acid, ethylenediaminetetraacetic acid, and their various alkali metal and ammonium salts; detergent builders such as the various sodium and potassium silicates, phosphates, and carboxylates; and surfactants such as anionic, cationic, and nonionic surfactants including, without limitation, alkali metal benzene sulfonates, alkali metal naphthenates, sodium alkyl sulfonates, dioctyl sodium sulfosuccinates, sodium polycarboxylates, and non-ionic surfactants such as polyoxyethylene and/or polyoxypropylene homopolymers and block and random copolymers. Further examples of surfactants which are useful in the present invention may be found in U.S. Pat. Nos. 5,468,422, 5,145,597, 4,954,545, and 4,904,309. These latter patents also include additional builders and chelating agents and are herein incorporated by reference.

The cleaning compositions of the present invention may be prepared by mixing the ingredients together in any order. The base may be advantageously added in solid form, or dissolved in minor amounts of water. The composition can include up to about 5%, preferably between 1-3% and most preferably less than 1% water.

The composition is added to the reactor which may have been washed to remove traces of monomer, and in the case of polymer polyols, to remove polyol from the reactor, but which may also simply have been drained. The cleaning composition is then added and the reactor heated and agitated. Preferably, the reactor is heated to temperatures between about 50° C. and 120° C., more preferably 60° C. and 100° C. Lower temperatures are also effective, but the cleaning time is increased by their use. Higher temperatures are effective as well and may increase the rate of scale removal. However higher temperatures may be equipment limited, particularly in view of the relatively high vapor pressure of acetone. In the case of batch and semi-batch reactors, the cleaning solution is advantageously pumped through circulation loops into and out of the reactor. In the case of continuous reactors such as tubular reactors, the solution may be introduced at one end of the reactor and taken off from the other, optionally to be recirculated back to the reactor inlet. Following treatment of the reactor for such time as to remove the most substantial part of the polymer scale, a final cleaning with fresh cleaning solution may be effected, or may be followed by cleaning with ordinary solvents or a water wash.

Following removal of the cleaning composition from the reactor, the cleaning solution may be reused, may be recycled, or may be burned for its fuel value. For example, following its initial use in polymer scale removal, the cleaning solution may be stored in a suitable vessel, and if necessary, the concentration of organic solvent, alkali, and other ingredients may be adjusted for later reuse. The solution may be reused in a second cleaning operation or even a third cleaning operation depending upon the amount of polymer scale removed from the reactor(s). Advantageously, a solution may be used several times as an initial cleaning solution, following which a fresh portion of cleaning solution may be used for a final cleaning of the reactor. This fresh portion of solvent is then used as the initial composition for subsequent reactor cleanings.

To recycle the cleaning composition of the present invention, the acetone and other volatile ingredients may be effectively distilled at pressures ranging from subatmospheric to superatmospheric. In this manner, virtually all of the acetone may be recovered, as well as any other low molecular weight components, for example any cosolvents such as methylethylketone and ethylacetate, and polar organic solvents such as lower alkanols and the like. Higher boiling polar organic liquids such as propylene glycol, ethylene glycol, and the like may be removed by distillation as well, or the distillation may be halted when the bulk of the acetone is removed. The residues may be burned for their fuel value, or in the case of residues containing large amounts of polymer and relatively small amounts of other ingredients, the polymers may be processed into moldable thermoplastics and the like.

By the term "minor" is meant less than 50% on a weight basis. By the term "major" is meant 50% or more on a weight basis. By the term "most minor" is meant about 1% by weight or less. By the term "substantial" as it relates to scale removal is meant about 30% or more. By the term "agitated" is meant that the scale removal composition is subjected to agitation, whether shaken, stirred, pumped, sprayed, or the like. The compositions and processes disclosed herein may comprise the ingredients disclosed, may consist only of the ingredients indicated to be necessary ingredients, or may consist essentially of these ingredients, optionally consisting of or consisting essentially of each or a combination of optional ingredients as well.

Having generally described this invention, a further understanding can be obtained by reference to certain specific examples which are provided herein for purposes of illustration only and are not intended to be limiting unless otherwise specified.

EXAMPLE 1

A scale removal composition is prepared by mixing together acetone, 5 weight percent propylene glycol, and 0.1 weight percent sodium hydroxide. A sample of a hard acrylonitrile/styrene/vinylidene chloride telpolymer scale is obtained by physically removing polymer scale from several locations in a commercial scale polymer polyol reactor, e.g., the reactor per se, heat exchanger, etc. A 4 gram sample containing equal parts of foulant from these locations is combined with 200 ml of the scale removal composition, and agitated at 100° C. for 4 hours. At the end of this period, the mixture is filtered to remove undissolved solids. It is determined that only 4 weight percent of the original scale remains undissolved.

COMPARATIVE EXAMPLE C1

A scale cleaning composition containing acetone, 0.1 weight percent sodium hydroxide, and 1 weight percent water is compared to the Example 1 scale removal composition. With this composition, 8.4 weight percent polymer scale remains undissolved. This Comparative Example indicates the superiority of the claimed compositions which contain a polar organic solvent.

COMPARATIVE EXAMPLE C2

The scale removal composition of Comparative Example C1 was employed with 5 grams of scale and 100 ml of scale removal composition and agitated for 4 hours at 60° C. Undissolved solids amounts to 11.2 weight percent of the original sample.

COMPARATIVE EXAMPLE C3

Pure acetone is used to remove polymer scale from a portion of the polymer polyol reactor system known to be most difficult to clean. The cleaning operation is conducted at 100° C. for 4 hours, and results in an undissolved residue which is 27 weight percent of the original sample.

EXAMPLE 2

The procedure of Comparative Example C3 is followed, but with a scale removal composition containing acetone, 0.1 weight percent sodium hydroxide, and 2 weight percent propylene glycol. Only 12.9 weight percent scale remains undissolved. This example demonstrates the clear superiority of the claimed composition over the use of acetone alone.

COMPARATIVE EXAMPLE C4

A scale removal composition is prepared from dimethylformamide containing 0.1 weight percent sodium hydroxide and 1 weight percent water. The foulant end procedure used to dissolve it is that of Comparative Example C2. The amount of polymer scale left undissolved is 19.9% of the original amount. This example demonstrates that use of highly polar aprotic solvents with base are markedly inferior to the subject compositions.

Having now fully described the invention, it will be apparent to one of ordinary skill in the art that many changes and modifications can be made thereto without departing from the spirit or scope of the invention as set forth herein.

What is claimed is:

1. A vinyl polymer scale removal composition, comprising:
   a) about 60 weight percent or more, based on the total weight of the composition, of a polymer scale removing solvent, said polymer scale removing solvent comprising about 80 weight percent or more of acetone based on the weight of said polymer scale removing solvent;
   b) from about 0.01 weight percent to about 0.5 weight percent, based on the total weight of the composition, of a strong base soluble in said composition, said strong base selected from the group consisting of alkali metal hydroxides, alkali metal alkoxides, alkyl ammonium hydroxides, and mixtures thereof; and
   c) from about 0.5 weight percent to about 30 weight percent of one or more polar organic solvents bearing one or more hydroxyl or amino groups.

2. The polymer scale removal composition of claim 1 wherein said polymer scale removing solvent is present in an amount of at least 80 weight percent and acetone comprises at least about 90 weight percent of said polymer scale removing solvent.

3. The polymer scale removal composition of claim 1 wherein said strong base is present in an amount of less than about 0.2 weight percent.

4. The polymer scale removal composition of claim 1 wherein said strong base is present in an amount of about 0.1 weight percent or less.

5. The polymer scale removal composition of claim 1 wherein said polar organic solvent is present in an amount of from about 0.5 weight percent to about 15 weight percent.

6. The polymer scale removal composition of claim 1 wherein said polar organic solvent is present in an amount of from about 1 weight percent to about 10 weight percent.

7. The polymer scale removal composition of claim 1 wherein said polar organic solvent is selected from the group consisting of $C_{2-6}$ alkylene glycols, $C_{2-6}$ alkylene glycol mono-$C_{1-4}$ alkyl ethers, $C_{1-6}$ alkanols, alkyl amines, alkanol amines, and mixtures thereof.

8. The polymer scale removal composition of claim 1 wherein said polar organic solvent is selected from the group consisting of methanol, ethanol, n-propanol, isopropanol, n-butanol, ethylene glycol, propylene glycol, 1,4-butanediol, ethanolamine, diethanolamine, triethanolamine, and mixtures thereof.

9. The polymer scale removal composition of claim 1 consisting essentially of about 90 weight percent or more acetone, about 0.05 to 0.2 weight percent alkali metal hydroxide, and about 2 weight percent propylene glycol.

10. The polymer scale removal composition of claim 1 wherein said composition further comprises one or more adjuvants selected from the group consisting of surfactants, sequesterants, detergent builders, and water in an amount not exceeding 3 weight percent.

11. A process for removal of polymer scale from a polymerization reactor comprising a) adding the polymer scale removing composition of claim 1 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

12. The process of claim 11 wherein said temperature is between about 50° C. and 120° C.

13. The process of claim 11 wherein said reactor is a polymer polyol reactor.

14. A process for removal of polymer scale from a polymerization reactor comprising a) adding the polymer scale removing composition of claim 3 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

15. A process for removal of polymer scale from a polymerization reactor comprising a) adding the polymer scale removing composition of claim 5 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

16. A process for removal of polymer scale from a polymerization reactor comprising a) adding the polymer scale removing, composition of claim 7 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

17. A process for removal of polymer scale from a polymerization reactor comprising a) adding the polymer scale removing composition of claim 8 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

18. A process for removal of polymer scale from a polymerization reactor comprising a) adding the polymer scale removing composition of claim 9 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

19. A process for removal of polymer scale from a polymerization reactor comprising a) adding the polymer scale removing composition of claim 10 to said polymerization reactor, b) agitating said polymer scale removing composition in said reactor; and simultaneously with said agitating, heating said polymer scale removing composition in said reactor at a temperature effective to remove a substantial portion of said polymer scale from said polymerization reactor.

20. A process for removal of polymer scale from a vinyl polymerization reactor employed in the production of polymer polyols, said process comprising a) adding to said reactor a polymer scale removing composition comprising about 90 percent by weight of acetone, about 0.2 or less percent by weight of one or more strong bases soluble in said polymer scale removing composition, and from about 1 to about 10 percent by weight of one or more hydroxyl or amino-group containing polar organic solvent soluble in said polymer scale removing composition; b) agitating said polymer scale removing composition in said reactor; and simultaneously with said agitating, heating said polymer scale removing composition in said reactor at a temperature from about 50° C. to about 120° C. to remove a substantial portion of said polymer scale from said polymerization reactor.

* * * * *